Oct. 19, 1926.
A. B. SHAPARD
FURNITURE GLIDER
Filed Sept. 26, 1922
1,603,876
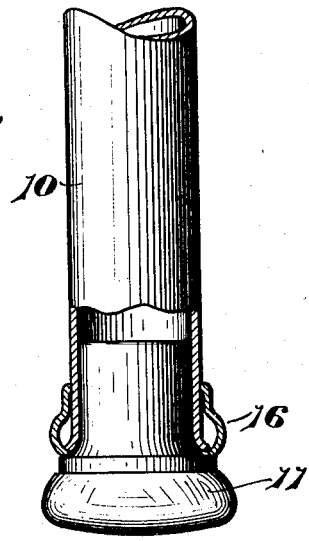
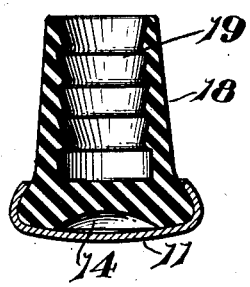
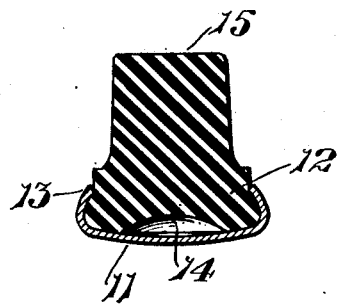
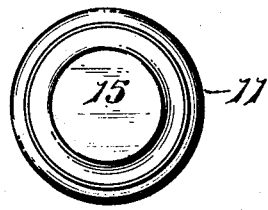
Inventor
AUBREY BREEDING SHAPARD.
By Dewey, Strong, Townsend and Loftus
Attorneys.

Patented Oct. 19, 1926.

1,603,876

UNITED STATES PATENT OFFICE.

AUBREY BREEDING SHAPARD, OF SAN FRANCISCO, CALIFORNIA, ASSIGNOR OF ONE-HALF TO DRAKE LOCK-NUT CO., OF SAN FRANCISCO, CALIFORNIA, A CORPORATION OF CALIFORNIA.

FURNITURE GLIDER.

Application filed September 26, 1922. Serial No. 590,735.

This invention relates to gliders or tips for furniture legs, and has for its object to provide a device of this character particularly suited for use in connection with the legs of beds, and which will serve to prevent marring of the floor and will act to absorb the shocks and noises incident to moving the bed.

In carrying out this object I make use of a metallic cup-shaped member and a rubber plug, the latter having an enlarged head which fits within the cup-shaped member and is held in place therein by crimping the rim of the cup. The plug has a rubber stem to fit within a socket in the furniture leg in a manner to be held in place by frictional contact. The enlarged head extends slightly above the rim of the metallic cup-shaped member so that the weight of the bed rests upon the head of the rubber plug and is cushioned thereby. This rubber plug serves to insulate the metallic cup-shaped member from the leg so as to absorb shocks and deaden the noise incident to moving an article of furniture about.

One form which my invention may assume is exemplified in the following description and illustrated in the accompanying drawings, in which—

Fig. 1 shows a side elevation, partly in section, of a leg of a bed fitted with a glider or tip embodying my invention.

Fig. 2 shows a sectional view of the glider or tip.

Fig. 3 shows a plan view of the same.

Fig. 4 shows a modified form of the device.

In the drawing, I show a hollow metal leg 10, such as is ordinarily used in beds. The glider or tip for the leg consists of a metallic cap piece 11, which is in the form of a cup having a smooth base made slightly convex. Into this cup-shaped member is inserted the head 12 of a rubber plug. After the head is in place within the cup the side walls of the cup are crimped, as shown at 13, to retain the head in place. It will be noted that the head of the plug has a convex portion 14 which is provided for the purpose of allowing the rubber to yield without unduly compacting the same when the walls of the cup are crimped.

The plug includes a rubber stem 15 adapted to fit tightly within the hollow leg 10 and be held in place therein by frictional contact. The enlarged head extends slightly above the rim of the cup so that when the parts are in place the furniture leg rests upon the projecting member. Ordinarily, these tubular legs 10 have a band 16 at their lower end to prevent the seam in the tube from parting, and this band therefore affords a widened surface to rest upon the projecting head of the rubber plug.

It will be noted that the metallic cup-shaped member is entirely insulated from the leg, and therefore vibrations of one are not imparted to the other. An article of furniture equipped with this glider or tip can be moved about without creating any noises or vibrations such as are ordinarily set up when furniture is moved along a floor. Furthermore, the smooth and comparatively flat surface of the bottom of the cup-shaped member will insure that the floor or carpet will not be marred or dented, as is the case where a caster is used.

The device herein shown and described is simple and inexpensive to construct and can be readily applied to articles of furniture already in use.

In the modified form shown in Fig. 4, a hollow plug 18 is substituted for the solid rubber plug. The bore of this plug is adapted to fit over the furniture leg, and its walls may be provided with annular ribs or teeth 19 to better grip the end of the furniture leg.

Various changes in the construction and arrangement of the several parts herein shown and described may be employed without departing from the spirit of my invention as disclosed in the appended claims.

Having thus described my invention what I desire to secure by Letters Patent is:

A glider or tip for furniture legs comprising a metallic cup-shaped member, a rubber plug having an enlarged head to enter the cup-shaped member and held therein by crimping the side walls of the cup, said head extending slightly above the rim of the cup and having a concavity to permit the rubber to yield without compressing the same when the cup is crimped thereon, and a rubber stem forming a part of the plug to fit within a socket in the furniture leg whereby the end of the leg will rest upon the projecting head of the plug and be insulated from the metallic cup-shaped member.

AUBREY BREEDING SHAPARD.